United States Patent [19]
Weitzen et al.

[11] 4,455,039
[45] Jun. 19, 1984

[54] ENCODED SECURITY DOCUMENT

[75] Inventors: Edward H. Weitzen, Lawrence; Salvatore F. D'Amato, Floral Park, both of N.Y.; Robert M. Fleming, Weston, Mass.; Manfred R. Kuehnle, New London, N.H.; C. Frederick Ekman, Harvard, Mass.; Jurgen Kruse, Branford, Conn.; Harold J. Weber, Sherborn, Mass.

[73] Assignee: Coulter Systems Corporation, Bedford, Mass.

[21] Appl. No.: 391,690

[22] Filed: Jun. 24, 1982

Related U.S. Application Data

[63] Continuation of Ser. No. 85,259, Oct. 16, 1979, abandoned.

[51] Int. Cl.$^3$ .............................................. B42D 15/00
[52] U.S. Cl. ........................................ 283/83; 283/82; 283/901; 283/58; 283/904
[58] Field of Search ..................... 283/82, 83, 84, 901, 283/58, 904

[56] References Cited

U.S. PATENT DOCUMENTS

| | | | |
|---|---|---|---|
| 3,169,899 | 2/1965 | Steuber | 428/198 |
| 3,829,373 | 8/1974 | Kuehnle | 283/8 R X |
| 3,904,420 | 9/1975 | Hunter | 283/8 R X |
| 4,066,280 | 1/1978 | LaCapria | 283/8 R |

FOREIGN PATENT DOCUMENTS

| | | | |
|---|---|---|---|
| 2001944 | 7/1971 | Fed. Rep. of Germany | 203/8 R |
| 1353244 | 5/1974 | United Kingdom | 283/8 R |
| 2035208 | 6/1980 | United Kingdom | 283/8 R |

*Primary Examiner*—Paul A. Bell
*Attorney, Agent, or Firm*—Silverman, Cass & Singer, Ltd.

[57] ABSTRACT

Documents are encoded with at least one thin, transparent coating, normally invisible, but having a readily detectable physical characteristic such as, electrical conductivity, electrical impedance, electrical capacitance, electroluminescence. Each document consists of a substrate on which is applied (1) at least one of the thin coatings, and (2) conventional printing, preferably intaglio. The thin coating may be applied before or after the printing. The coating includes particles driven into the surface to a substantial depth. The uncoated substrate is free of the detectable physical characteristic. The coating is confined to a limited area of the substrate surface and itself constitutes a code or is laid down in a pattern for identification. A second coating can be applied so that all areas of the surface have the same appearance to mask visual detection of the first coating. The first coating can be of such a nature as to defeat electrostatic copying, particular, color copying, by effecting a discernible difference between the original and the copy. Each coded coating is detectable by a machine which is capable of quickly distinguishing a genuine document from a counterfeit document.

29 Claims, 20 Drawing Figures

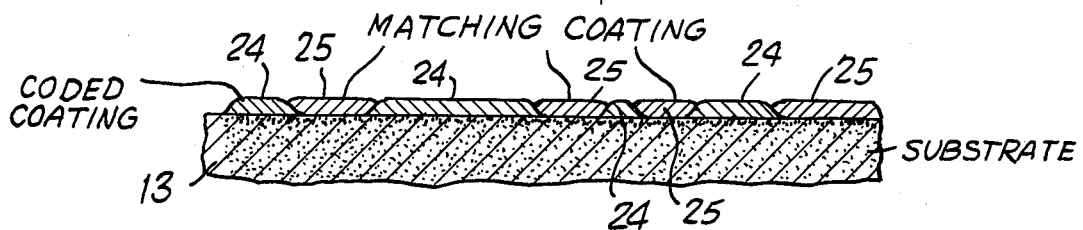
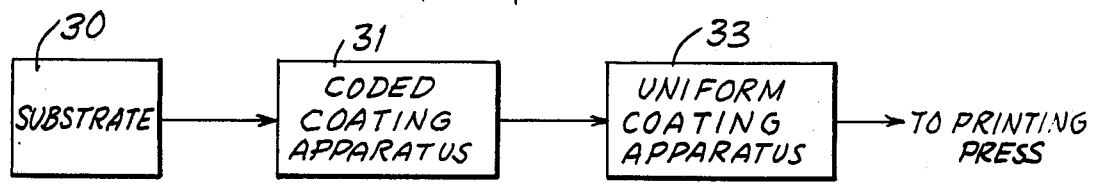
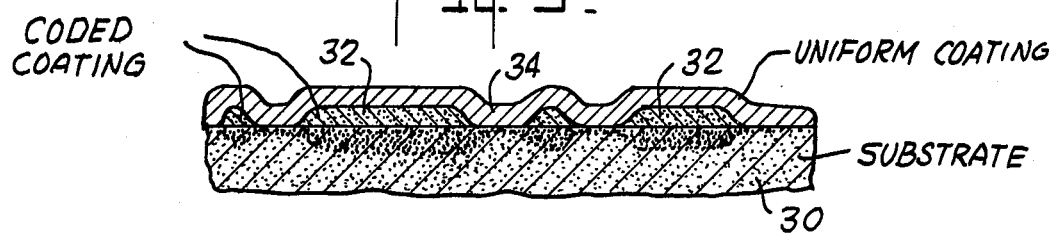
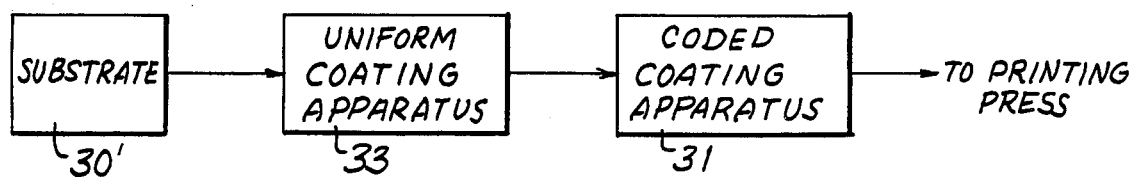
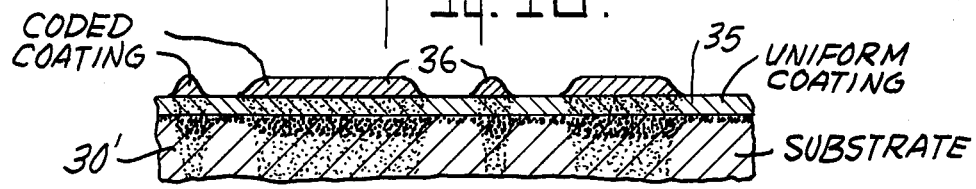

ENCODED SECURITY DOCUMENT

This is a continuation, of application Ser. No. 085,259 filed Oct. 16, 1979, now abandoned.

BACKGROUND OF THE INVENTION

Considerable effort has been directed to provide a security document difficult to counterfeit. Means were sought whereby the genuineness of the security document can be effectively discerned. In order to be acceptable, the means only should be detectable under limited circumstances, and should otherwise be undetectable. Acceptable means should be capable of encoding. When detected, such means should have a clear and unmistakable presence, should withstand wear, aging and other physical impairment of the substrate; and should be economically feasible.

The code should not be obviously visible, should not be capable of application by standard printing techniques, should be applicable to various types of substrates employed to form document of a security nature, should require high cost, highly specialized equipment for application, yet provide a document only marginally increased in cost over the non-coded product. Further, the coating of which the code is formed must be formed of a material which is non-toxic, stable, and detectable with low cost equipment.

BRIEF SUMMARY OF THE INVENTION

Security documents of value, prepared in accordance with the present invention, are made difficult to counterfeit by placing thereon an invisible coating having a machine-detectable physical characteristic in a limited location of at least one surface of the document. A subsurface region having the same characteristic underlies the coating. For example, the limited location of the coating may consititute a bar code, in which both the number and width of the bars are significant. The code thus identifies a genuine document, and may also function as a denomination code. The location of the coating is detectable only by suitable apparatus which thus distinguishes between genuine and counterfeit documents.

In its simplest form, the invention comprises a substrate, such as but not limited to paper, on which a coating is applied. A very thin (preferably less than about 200 Angstrom units thick) coating of electrically conductive material is deposited on the surface of the substrate. Preferentially coating is deposited by a cathode sputtering wherein particles thereof are driven toward the surface, building up a coating on the surface and driving some particles into the surface to a substantial depth, which may be many times the thickness of the surface coating. The presence of these particles makes that part of the substrate electrically conductive. Even though the surface coating becomes worn, the conductive material within the substrate retains its conductivity and therefore retains its ability to identify the document as genuine.

One of the coatings may be of electrically conductive material. The coating is continuous over one or more areas of the document, even in those locations where it is printed over, or where it is applied over printing. An electrical characteristic, e.g., impedance or capacitance is measurable by appropriate apparatus. If the characteristic falls within predetermined limits, the apparatus indicates that the document is genuine.

BRIEF DESCRIPTION OF THE DRAWINGS

FIG. 8 is another fragmentary enlarged sectional view of a substrate constructed in accordance with the invention and having complementary coatings which completely cover one surface of the substrate.

FIG. 9 is a fragmentary enlarged sectional view of a substrate having a coded coating and a uniform coating over the coded coating.

FIG. 10 is a fragmentary enlarged sectional view showing another modification of the invention wherein the substrate carries a uniform coating and a coded coating is applied thereto.

FIG. 18 is a flow representation illustrating the means for forming the modified substrate shown in FIG. 9.

FIG. 19 is a diagrammatic flow representation illustrating means for forming the material of FIG. 10.

DESCRIPTION OF PREFERRED EMBODIMENTS

Briefly, the invention provides a security document having means applied thereto which effectively protect such document against counterfeiting and/or whereby copying, as by electrostatic copying means, can be defeated due to the obvious visual difference between the copy and the original.

According to the invention, a coating is applied to the substrate. The coating has a physical characteristic which is machine detectable but otherwise is invisible. The detectable physical characteristic may be electrical conductivity, electrical impedance, electrical capacitance or may constitute characteristic electroluminescence or phosphorescence of the coating material, depending upon the particular material selected to comprise the coating. The coating may be applied in a prescribed pattern, in continuous bands along the one dimension of the document, in combination with printing, overprinting or the like, or alone, and constitutes code. Further, the first or characteristic containing coating may be overlaid with a second coating in partial or full registry therewith. Portions of the first coating, that is particles thereof, enter the substrate below its surface by being driven thereinto during deposition of the said coating.

Additionally, there will be described an embodiment of the invention wherein the coating has characteristic electroluminescence or phosphorescence or otherwise includes a material which produces a readily apparent visual difference between the original and an electrostatically produced copy thereof, particularly in respect of electrostatic color duplication processes.

Figure 1:
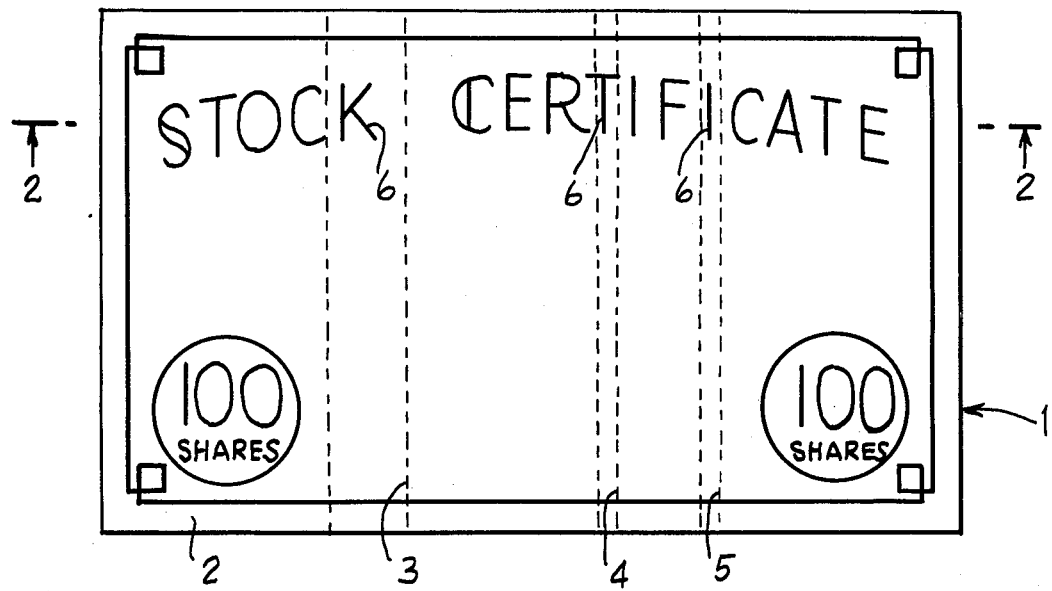
FIG. 1 is a plan view of a document prepared in accordance with the invention.
Figure 2:
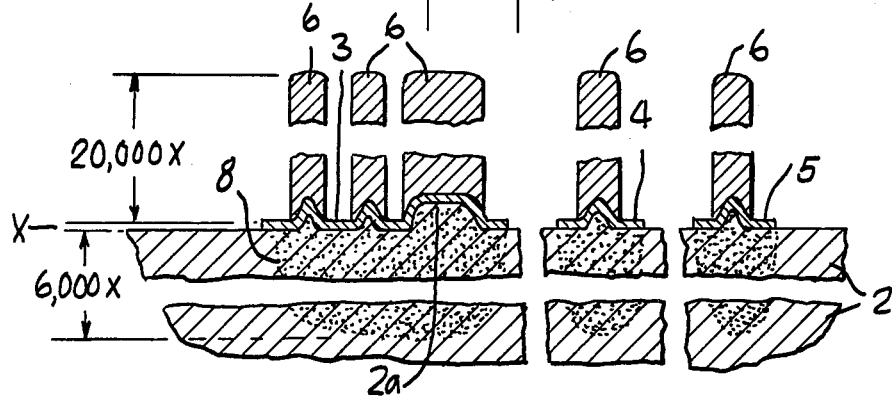
FIG. 2 is a fragmentary cross-sectional view taken along line 2—2 of FIG. 1, with the vertical dimensions greatly enlarged and the horizontal dimensions somewhat enlarged.

Referring now to the drawings, in FIGS. 1 and 2 a security document, in the form of a stock certificate, is indicated generally by reference character 1 and comprises a substrate 2 and a coating in the form of three bands 3, 4 and 5 deposited on a portion thereof. Substrates may be formed of paper, that is a porous fibrous cellulosic material, or may comprise a spunbound polyolefin composition say polyethylene or polypropylene such as marketed under the trademark TYVEK ® by the E. M. DuPont DeNemours Company and/or is described in U.S. Pat. No. 3,169,899 (Steuber). The coating must have a distinctive physical characteristic, e.g., electrical conductivity, resistivity, etc. which is absent from the substrate. The deposit of said coating on the substrate can be effected at any time subsequent to formation of the substrate, conveniently immediately after the process of forming the substrate. It may be accomplished by use of coating apparatus as shown in diagrams or by a modification of the apparatus shown in the patent to Kuehnle, U.S. Pat. No. 3,829,373, which is incorporated by reference herein. The coating apparatus which deposits the bands 3, 4 and 5 of electrically conductive material, such as indium tin oxide at specific locations on substrate 2. The bands, and particularly the location thereof constitute a code which identifies the finished document as a genuine document and also can serve as a code representing denominational values.

In the illustrated example, which is a stock certificate for 100 shares, the location code is a bar code in which both the width and number of bars are significant. The code identifying the number of shares consists of a wide band 3 and two narrow bands 4 and 5, as illustrated. The invention is applicable to all documents of value, including currency.

Substrate 2 carrying bands 3, 4 and 5 thereafter is printed with words or other indicia required to complete the finished document 1. The printing of such documents is commonly done by an intaglio printing process, in which the substrate material is forced under high pressure into inked recesses in a printing plate, so that the material of the substrate is raised in ridges under the ink, as shown at 2a in FIG. 2.

The bands 3, 4 and 5 have a thickness preferably less than 200 Angstrom units, and are transparent and invisible. The ink deposited on the substrate during the printing process typically has a thickness, including the raised ridge in the substrate, of about 0.002". Thus, the ink thickness is about twenty thousand times the thickness of the conductive bands 3, 4 and 5, as indicated by the dimensions X and 20,000 X in FIG. 2. The contours of the inked letters, as shown in cross-section at 6 in FIG. 2, are variable when viewed on a scale such as that employed for the vertical dimensions in FIG. 2. The contours shown at 6 in FIG. 2 are idealized.

Some of the particles of the coating material are driven into the substrate during the coating process and penetrate the substrate to a considerable depth, forming sub-surface regions 8 (FIG. 2). Regions 8 are much thicker than the coatings 3, 4 and 5. For example, the depth of penetration of the particles may range up to about 6,000 X where X is the thickness of the sputtered coating. The density of distribution of the penetrated particles is greatest near the surface of substrate 2, said density decreasing inversely with the depth of penetration.

Preferably, the thickness of the coating bands 3, 4 and 5 should not exceed about 200 Angstrom units so that the coating is as thin as possible with maintenance of its integrity. Generally, the coating thickness is limited to that which would make the coating readily visible. In some instances, even a visible coating may be acceptable or even desirable. With some coating materials, the thickness can be greater than 200 Angstrom units without the coating becoming visible. It is important that the likely counterfeiter be unaware of the presence of the code. Where the coating material is indium tin oxide, the coating is not visually apparent at a thickness of 200 Angstrom units. Further, reduction in coating thickness is an economic benefit in speeding the coating process.

Figure 3:
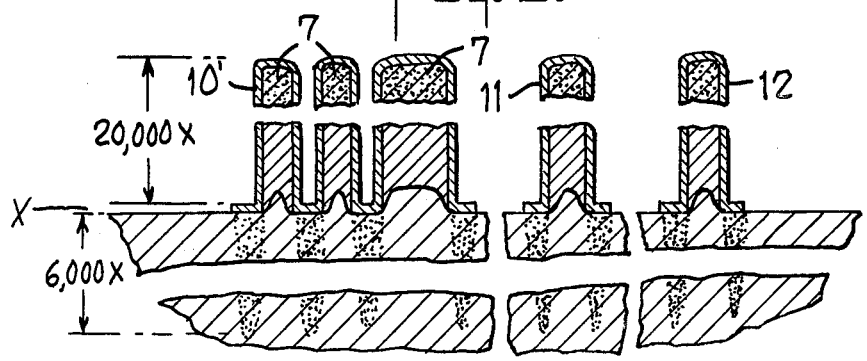
FIG. 3 is a view similar to FIG. 2, showing a modified embodiment of the invention.

Referring to FIG. 3, a security document 10 differs from the document represented by reference character 1 in that the document 10 is printed first and the characteristic coating represented by reference character 7 is applied thereafter. Thus the inked letters appear to provide characters 7 having the coating bands 10', 11 and 12. The bands 10', 11 and 12 cover some of the inked letters completely. The particles which penetrate the letters during the coating process do not go all the way through those letters, since the ink layer is thicker than the maximum depth of penetration of the particles.

Both the coated bands 3, 4 and 5 and 10', 11 and 12 can be detected either conductively, inductively, or capacitatively.

Figure 4:
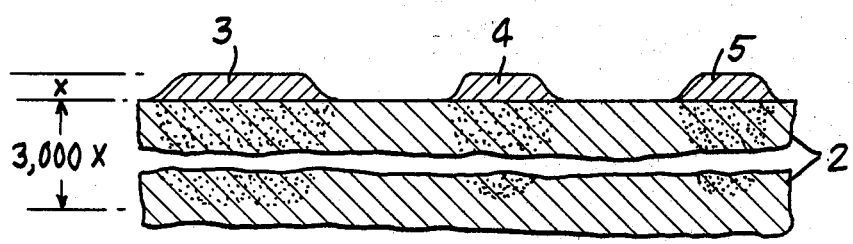
FIG. 4 is a fragmentary enlarged sectional view of a coated substrate in accordance with the invention prior to printing thereon.

Referring to FIG. 4, the substrate 2 of FIG. 2 is illustrated but the overprint 6 is absent. Such a material can be prepared as a printable sheet material in condition for printing to make same into a document of value.

Figure 5:
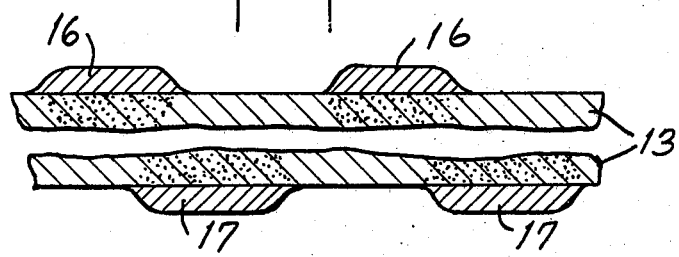
FIG. 5 is a fragmentary enlarged sectional view of a coated substrate constructed in accordance with the invention and having coatings on both sides thereof.

In FIG. 5, the substrate 13 has been supplied with a coating 16. A second coating 17 is applied to the opposite surface of the substrate 15. Both coatings 16 and 17 may be electrically conductive, and each may be detected separately and conductively by apparatus including spaced contacts which physically engage one coating. Inductance or capacitance means would detect both coatings at the same time, and could be used if the two coatings and the detecting apparatus were designed to cooperate.

Figure 6:
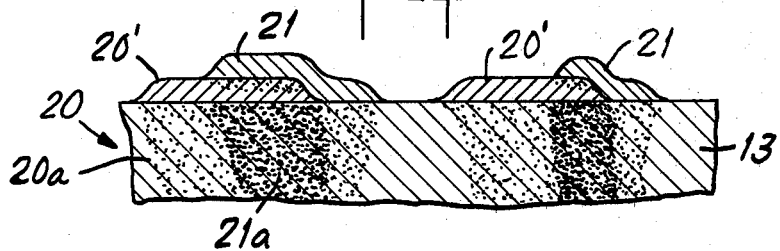
FIG. 6 is a fragmentary enlarged view in section of another coated substrate constructed in accordance with the invention and two partially overlapped coatings on one side thereof.

The document 20 of FIG. 6 carries a coating 20' and the second coating 21, which partially overlaps the coating 20. Either coating 20' or 21 may be electrically conductive and the other non-conductive. Alternatively, both coatings may be electrically conductive. Using the two coatings of different materials, both electrically conductive, enables the conductivity of the combined coatings to be controlled so that the conductivity remains within predetermined limits.

Figure 7:
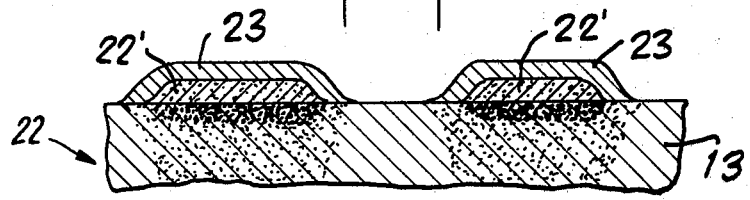
FIG. 7 is a view similar to FIG. 6, showing a further modification of the invention having the two completely overlapped coatings on one side thereof.

The document 22 of FIG. 7 carries coating 23 completely overlapping coating 22'. Again, either or both coatings may be electrically conductive. If only the coating 22' is electrically conductive, sensing by contact is not possible but so that sensing must be effected, say by induction.

Since the coatings 20' and 21 are of different materials, the characteristics of the substrate 13 in regions under only one coating, as at 20a, will be different from the characteristics in regions under the overlapped coatings, as at 21a. This difference is indicated by the different representations used in the Figure for the two regions. Similar differences in the characteristics of the substrate are indicated, in similar manner, in FIG. 7.

In FIG. 8 a coated substrate is illustrated on which a coded electrically conductive coating is applied in spaced regions such as bands 24, with the spaces between the bands 24 being covered with a second coating 25 of a different and electrically non-conductive material. Since all surfaces of the substrate 13 are coated, the same external gloss or texture appears throughout the surface of the resulting document. The location of the conductive bands 24 cannot be determined by visual observation. Substantially all materials capable of being electrically deposited produce coatings which, in the preferred thickness range, have the same visual appearance. Thus, it is not difficult to select a material for coating 25 which visually matches the code coating 24.

FIG. 9 illustrates a printable, coated substrate 30 carrying a first coded coating 32 deposited on portions of the substrate 30 and another coating 34 has been deposited on the entire surface of the substrate. The whole surface of the substrate 30 is of the same appearance with the location of the coded coating 32 concealed from visual observation.

In FIG. 10, substrate 30' is illustrated wherein the uniform coating 35 is deposited first on the entire surface of the substrate 30' and the coded coating 36 is applied over only a portion of the coating 35. The coatings 35 and 36 are selected to be substantially the same in visual appearance, so that the location of the coded coating is not visually detectable.

Figure 11:
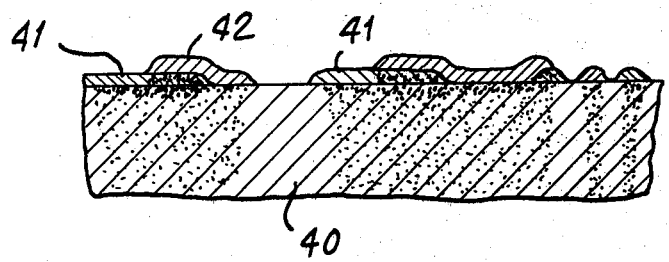
FIG. 11 is a fragmentary enlarged sectional view illustrating a substrate having two separately detectable coatings applied to one surface thereof.
Figure 14:
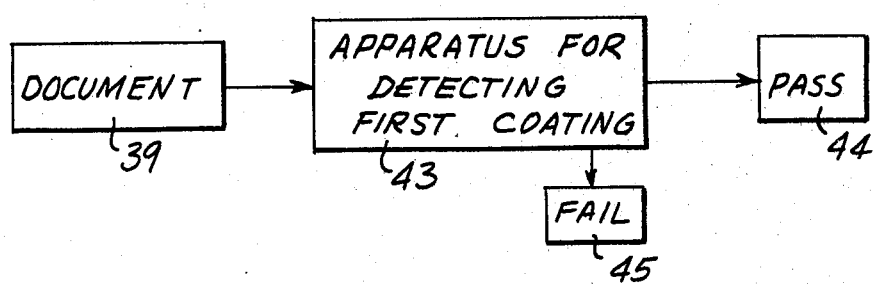
FIG. 14 is a diagrammatic flow representation illustrating means for detecting one of the two coatings on the materials of FIG. 11.

FIG. 11 shows a modified embodiment of the invention wherein a first coating 41 covers selected portions of the substrate 40 and a second coating 42 covers other selected portions, partially overlapping the first coating 41. The two coatings 41, 42 are detectable separately because of different characteristics in the two coatings. One of the coatings 41, 42 may be electrically conductive, and the other may be luminescent.

The encoding coating may comprise a phosphorescent material wherein the detecting medium may involve measurement of its phosphorescence such as results by exciting the coating with a "black pen light" (254 Nanometers) followed by measurement after a few milliseconds at a different location. Thus by selection of the proper wavelength and decay time, recognition and quantitative measurement could be effected. Employment of phosphorescence as a detecting medium requires that the completed coating be invisible whereby both excitation and emission frequencies must be outside the visible spectrum. Electrical excitation is feasible instead of optical excitation, as is the measurement of X-ray fluorescence, as by use of calcium tungstenate.

The invention contemplates use of the encoded coatings to provide means whereby copying of a document is prevented by assuring that the electrostatic copying thereof would result in a copy having a readily apparent visual difference between it and the original. Fluorescent dye materials such as quinine sulfate, uranine, disodiumtetrabromofluorescein and combinations thereof have been provided, here impregnated into the substrate in a code pattern, with a resultant observable shift in the signal being observed. Emission in the visible frequency while absorption in the ultraviolet frequency has been observed.

One system for defeating copying, especially by an electrostatic copier, involves the use of a metallic stripe, such as an Aluminum coating about 500 Angstroms. Aluminum takes advantage of the difference in reflectivity of such stripe. The metallic aluminum deposit was observed to absorb more red than blue, and thus would appear different to the eye than to the copier. Thin coatings, of the order of 100 to 50 Angstroms or below, are preferred.

The aluminum or chromium stripe was overcoated with Titanium Nitride and provided distinguishment between copy and original. The employment of irridescent coatings which appear to change in hue depending upon the angle of illumination and viewing, is feasible to provide a color copy defeating means. These coatings appear multicolored under normal viewing conditions but because the angle of illumination and the incidence of reflected light onto the detector are fixed in a copier, the coating copies as a single hue. This results in a significant difference between the original and the copy.

Figure 12:
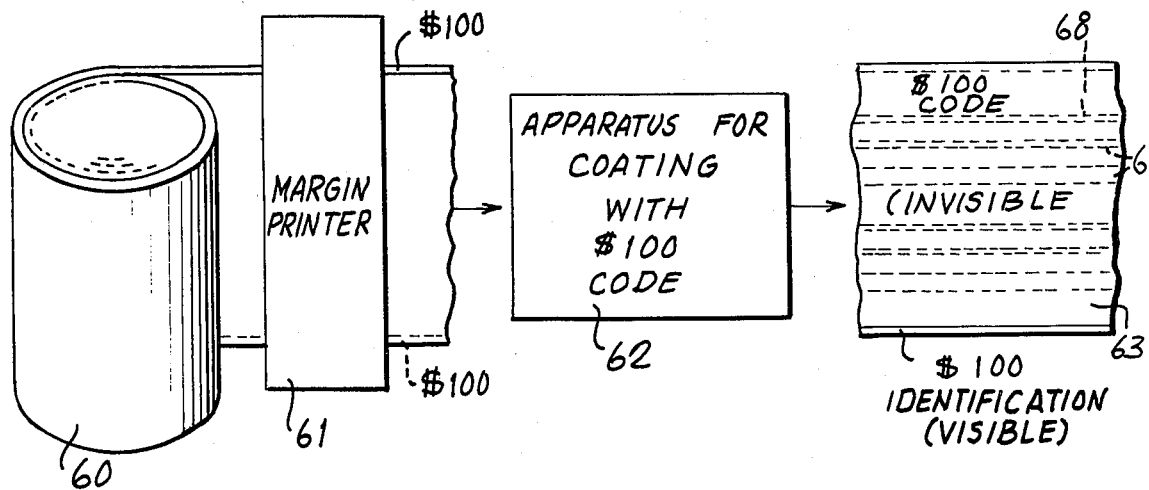
FIG. 12 is a diagrammatic representation illustrating means for coding a web to be printed with a marginal code corresponding to the denomination to be printed on the web.
Figure 13:
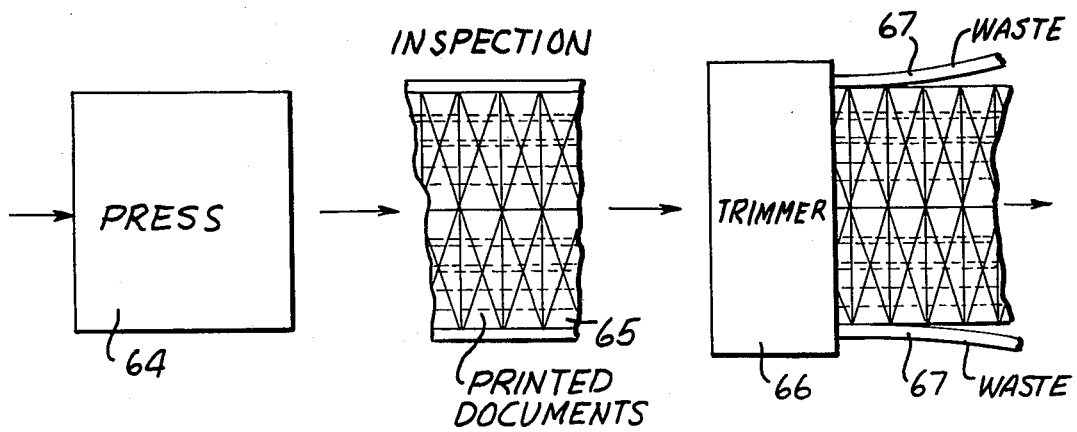
FIG. 13 is a diagrammatic representation illustrating the printing, inspection, the trimming method to be followed with a web produced by the apparatus of FIG. 12.

Referring to FIGS. 12 and 13, there is illustrated a process for placing a coded coating on a web of material to be printed and thereafter printing security documents of value on the web, so as to make sure that the printed data, such as the denomination, on the documents corresponds to the code represented by the coating.

A roll of sheet material, shown at 60, is first passed through a margin printer 61 where, at spaced locations on at least one margin of the web, there is printed data identifying the denomination to be printed. The web then is passed through apparatus 62 for coating the document with a denominationally coded coating 68 corresponding to the markings on the margin. The coating 69 can be in the form of bands, as shown. The coated web represented by reference character 63 then is transferred to printing press 64 (FIG. 13) where documents 65 are printed on the web. The resulting printed web, which may have been cut into sheets, passes to an inspection station where it is determined that the printing on the document 65 corresponds to the code and to the information printed in the margins. The web or sheets then pass to a trimmer 66 which cuts off the margins 67.

The coated bands, 3, 4 and 5 may be detected either conductively by apparatus having contacts which engage the bands, or inductively or capacitively, by apparatus that does not contact the bands 3, 4 and 5.

While it might appear that the ink letters 6 in FIG. 2 would interfere with a conductive contact with the bands 3, 4 and 5, it should be noted that the bands are much wider than the printed letters 6, and that the bands 3, 4 and 5 are continuous. Hence, conductive contacts made at spaced points on any of the bands 3, 4 or 5 may be utilized to measure the conductivity of the band between those contact points. The surface finish of the contact probes which engage the bands 3, 4 and 5, should have a range of variation of smoothness of the same order of magnitude as the thickness of the printed letters 6, so that some points on the contact probes engage the bands, even though the printed letters intervene between the probes and the bands. The problem described above with respect to the contact with the bands 3, 4 and 5 does not exist with coatings 10, 11, and 12 since the latter are placed over the printed letters 7.

Where the anti-counterfeit protection coatings are deposited on documents subject to substantial wear, the conductivity of the material decreases, and hence its impedance increases, as the coating and possibly the underlying substrate, becomes worn. The measurement of impedance may be used as a measure of wear. For example, in a given document, a range of 5K–10K ohms would indicate that the document was genuine, while an impedance in the 9K–10K range would indicate that the document should be retired from circulation.

Figure 15:
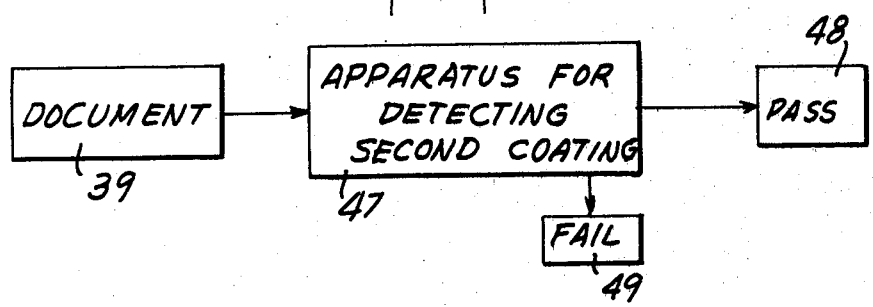
FIG. 15 is a diagrammatic flow representation illustrating means for detecting the other coating on the materials of FIG. 11.

Referring to FIG. 15, the document 39 comprising the coated substrate 40 of FIG. 11 with the inked letters printed on it is passed through detecting apparatus 43 for detecting the first coating 41 and is forwarded to a location 44 marked "PASS" if the required coating is found and is diverted to a second location marked "FAIL" if the required coating is missing. In FIG. 15, the same document 39 is passed through detecting apparatus 47 which detects only the second coating and either forwards it to a "PASS" location 48, or diverts it to a "FAIL" location 49.

Figure 16:
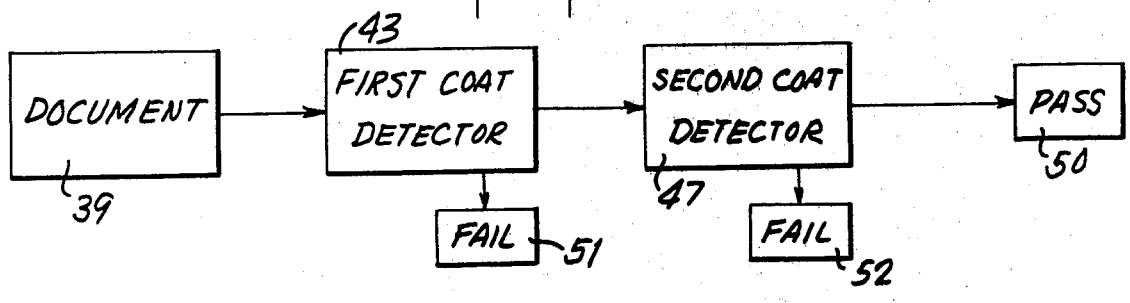
FIG. 16 is another diagrammatic flow representation illustrating means for detecting both the coatings on the materials of FIG. 11.

In FIG. 16, the document 39 travels successively through an apparatus 43 for detecting the first coating and an apparatus 47 for detecting the second coating. The document must be passed by both detectors 43 and 47 in order to reach the "PASS" location 50. Failure of either coating to be detected results in diversion of the document to one of the "FAIL" locations 51 and 52.

The encoding coatings described herein preferably have a thickness of 200 Angstrom units but may include those from 50 Angstrom units to 300 Angstrom units in thickness. Resistances varying from less 1,000 ohms to above 30,000 ohms were measured. Coatings have measured resistances in the range from 10,000 to 100,000 ohms even after overprinting and aging. Preferably, the coating material employed is Indium Tin Oxide containing not less than 50 percent indium oxide content. Where the detection is effected using a pair of probes, say 1 centimeter apart contacting the band, 5,000 measured ohms effects satisfactory detection. Resistance increases upon exposure to air and also is increased with overprinting and wear. A stable period of considerable duration has been observed.

Measurement of capacitance can function as the detecting method and can provide quantitative measurements useful in determining denominational information. Capacitance measurement is effective even after the document has been exposed to steam, hot water and repeated abrasion or other abuse.

In addition to the use of Indium Tin Oxide, very thin films of Tin Oxide-Antimony oxide were deposited.

An example of a coating material which can be employed to provide a document characterized in production of a significant visually discernible difference between an original and an electrostatically obtained copy is a reflecting aluminum stripe which is metallic in appearance but fails to copy, say in a color copier such as the Xerox Color Copier Model No. 6500. Other examples include chromium metal coatings, aluminum metal coatings overlaid with a sputtered titanium nitride, chromium metal coatings overlaid with a sputtered titanium nitride, both aluminum and chromium coatings, each overlaid with sputtered zinc oxide, both aluminum and chromium metal coatings overlaid respectively with a second coating of aluminum and chromium, both aluminum and chromium metal coatings respectively overlaid with transparent dye/resin mixtures, and coatings of irridescent materials. Specific examples of such compositions shall be set forth. The metal coatings of aluminum are deposited for example, by vacuum evaporation techniques well known in the art. Dye/resin compositions including those employing both fluorescent and non-fluorescent dyes as well as those employing both fluorescent and non-fluorescent pigments can be employed in practicing the invention.

In one example, a stripe of aluminum metal was vapor deposited on a paper substrate. Coating thicknesses of from 100 Angstrom to 500 Angstrom units were provided, with reflectivity being satisfactory at 500 Angstrom unit thickness but decreasing with reduction in thickness. The aforementioned electrostatic color copier provided reproductions of these stripes as bands as relatively grainy areas, ranging from pale yellow-green in color as 500 Angstrom unit thickness stripes to a progressively darker cyan-magenta component appearing in the series as the thickness decreased.

One possible explanation of the absence of detection of color of the band in the original and the detectable color in the copy may be described as metamerism, i.e. the human eye does not respond to the intrinsic colors present in the metal coating under daylight or ordinary room light conditions. When the spectral properties of the light system are shifted by changing the output resulting from the absorption/reflection ratio of the coating combined with the incident illuminating radiation, as well as the absorption of the reflected light by the photoconductor of the photoconductive element (selenium), a different color balance is produced. Accordingly, the coating copies visually distinctively different than the original.

Corresponding coatings of chromium metal, also vapor deposited by vacuum evaporation technique, were applied to a paper substrate in thicknesses as thin as 50 Angstrom units through the 100, 300 and 500 Angstrom unit thicknesses. The colors obtained in copying are not matched visually with those obtained employing the aluminum metal coating but there appeared to be a metameric displacement of color produced to distinguish the copies from the original.

Overlays of titanium nitride, about 600 Angstrom units in thickness, were applied to each of the metal coatings, i.e. aluminum and chromium, to give colors ranging from a dull yellow grey at 50 Angstrom unit thickness to yellow brown at 500 Angstrom unit thickness. The corresponding colors upon copying, using the aforementioned copier device, were a brilliant yellow at 50 Angstrom unit thickness to browner colors with increasing thicknesses. The areas between stripes were reproduced with very light color, possibly because of edge effect essentially devoid of color. Similar differential results in comparing copies with originals were experienced with the chromium/titanium nitride overlaid coatings.

Corresponding coatings of chromium metal, also vapor deposited by vacuum evaporation technique, was applied to a paper substrate in thicknesses as thin as 50 Angstrom units through the 100, 300 and 500 Angstrom unit thicknesses. The colors obtained in copying are not matched visually with those obtained employing the aluminum metal coating but there appeared to be a metameric displacement of color produced to distinguish the copies from the original.

Overlays of titanium nitride, about 600 Angstrom units in thickness, were applied to each of the metal coatings, i.e. aluminum and chromium, to give colors ranging from a dull yellow gray at 50 Angstrom unit thickness to yellow brown at 500 Angstrom unit thickness. The corresponding colors upon copying, using the aforementioned copier device, were a brilliant yellow at 50 Angstrom unit thickness to browner colors with increasing thicknesses. The area between stripes were reproduced with very light color, possibly because of edge effect essentially devoid of color. Similar differential results in comparing copies with originals were experienced with the chromium titanium nitride overlaid coatings.

Zinc oxide overlays were applied to stripes of aluminum and strips of chromium on a paper substrate with discernable, obviously differentiatable copy relative original results. The first coatings of aluminum metal were vacuum evaporated on paper in thickness ranging from 30 Angstroms to 60 Angstroms, and then overcoated with bands of 10, 25 and 100 Angstroms unit thickness chromium. The color of the chromium bands ranged from tan to dark gray in order of increasing thickness. The copies ranged from pale yellow in the thinner coatings increasing with thicknesses to yellow-green to green as thickness increases. However, the 100 Angstrom overcoated chromium band appeared as a uniform dark green color over all the aluminum stripes regardless of the aluminum coating thickness.

An evaporated coating of chromium was deposited on paper at 30, 40, 50 and 60 Angstrom unit thicknesses and overcoated with aluminum bands 10, 25 and 50 Angstrom unit thicknesses. The 10 Angstrom unit stripe of chromium was invisible on the original, even in the overcoated areas. The 25 Angstrom unit thickness aluminum coating was visible as a very pale yellow-gray area separating the chromium bands but was essentially invisible in the overcoated area. While the 50 Angsrrom unit thick aluminum coating was visible as a gray area on the original portions, the overcoated areas appeared to be slightly visible on the thinner undercoatings while being less visible on the thicker bands. The electrostatically obtained copies of the respective single and double coated originals were distinct as compared with the originals, with some not reproducing at all.

Bands of aluminum and of chromium separately were vapor deposited on a paper substrate and second coatings containing a fluorescent dye, a non-fluorescent dye, and a fluorescent pigment in resin were applied as overcoatings respectively. Differential copy effect was observed although the primary discernment appeared to be due to the metal coating per se. Red, green and yellow dyes dispersed in resin also were applied to stripes of vapor deposited aluminum and chromium, respectively.

An example of an irridescent coating material employed to provide produce differential visual effects between electrostatically obtained copies and their originals included commercially available pigments such as white pearlescent. These pigments have the property of producing a rainbow effect upon illumination by visible light and a continuous shift in color with selected predominant colors depending upon the viewing angle. Colors reproduced on electrostatically obtained copies were incapable of displaying the continuous color changes characteristic of irridescence, i.e., effected a static system as contrasted with the irridescent system. The contrast obtained varied considerably between the original and the copy.

Figure 17:
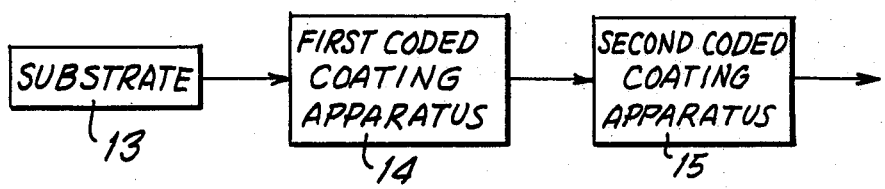
FIG. 17 is a diagrammatic flow representation illustrating means producing the modified embodiment of the invention shown in FIGS. 6 to 8.

FIG. 17 is a diagrammatic flow representation illustrating the process for applying the coating such as shown in FIG. 4. In that process, the substrate is passed to a first encoding coating apparatus 14 and thence to a second coded coating apparatus 15. FIG. 18 illustrates the process of applying a uniform coating over a coded coating. The substrate 30 is passed into and through an encoding coating apparatus 31 and from there, is taken through the uniform coating apparatus 33.

Figure 20:
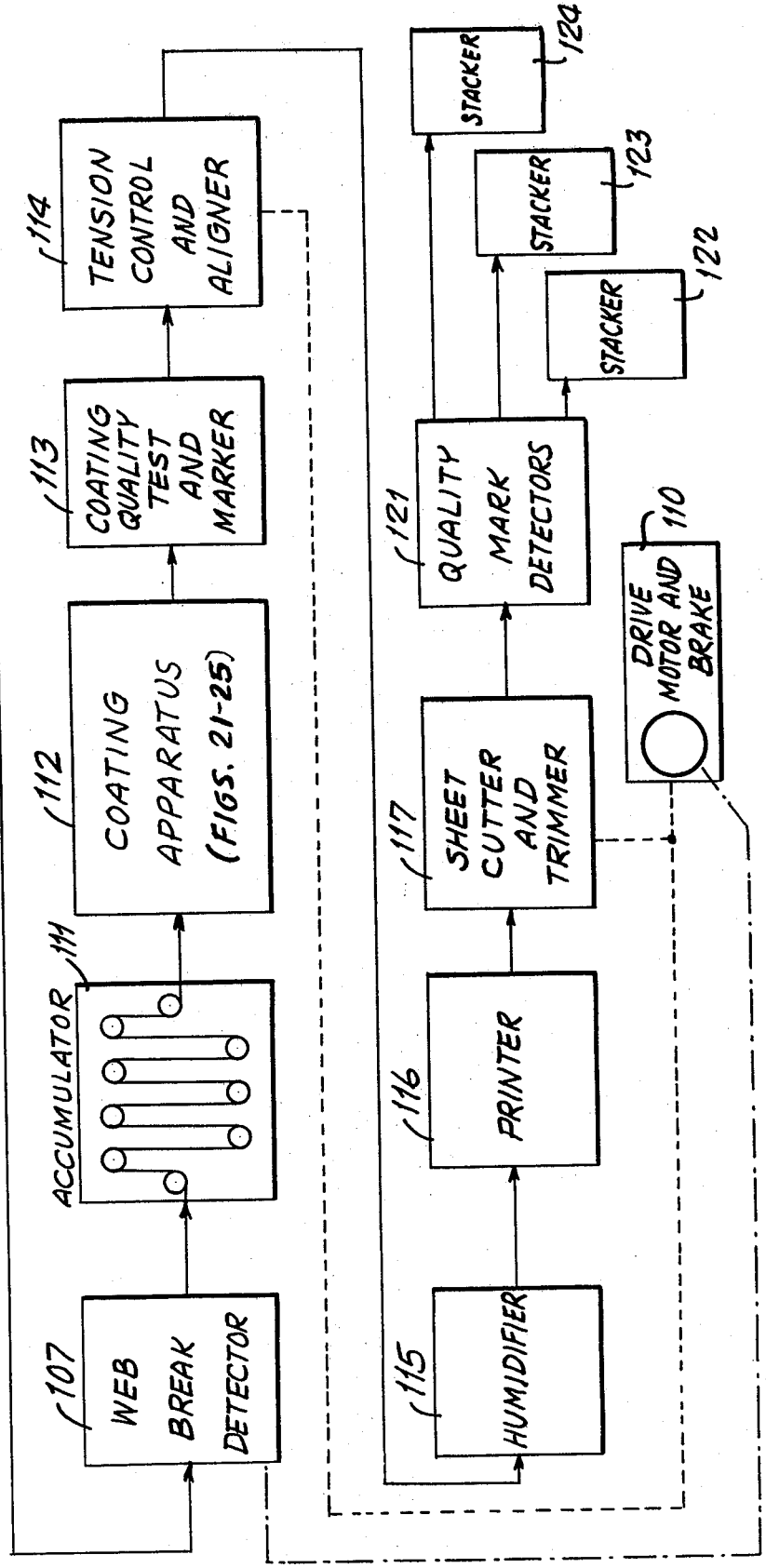
FIG. 20 is a diagrammatic flow diagram of the process for handling a web through the process of forming the security document according to the invention.

A flow diagram comprises FIG. 20 to the coating of paper, for example, to provide the security document in accordance with the invention. Other substrates may be able to use less elaborate apparatus. If a spunbonded olefin is used, the various vacuum pumping steps described below may be considerably simplified, and to some extent even eliminated since this material has much less absorbed gas and moisture than paper sheet.

The continuous web 100 to be coated is supplied from a unit 101 which may include two alternately used web supply reels and a splicer, and then passes through a tension control 102, an aligner 103, a web cleaner 104, a static eliminator 105, and a web quality test and marker unit 106. The web quality test and marker unit may be a photoelectric apparatus which scans the web for holes, slimy spots and other imperfections, and marks the web in one margin adjacent any such imperfection. The web then passes through a web break detector 107, which controls a web driving motor 110 and an associated brake, so as to stop the motor and apply the brake quickly when a break in the web is detected.

The web then passes through an accumulator 111, comprising a set of opposed pairs of rolls which accumulates a substantial length of web.

A coating apparatus 112 just beyond the accumulator along the path of the web and is evacuated to a very low pressure. The repair of a break in the web is facilitated if the web is stopped with the break outside the coating unit 112. The accumulator 111 stores a sufficient length of web so that the web can be stopped with the break in the accumulator, or elsewhere outside the coating unit 112. If the web is so stopped, the coating unit 112 does not have to be opened to repair the broken web.

The web leaving the coating apparatus 112 moves through a coating quality test and marking unit 113, which marks a margin of the web wherever the coating is inadequate. Preferably, this test and marking unit marks the margin of the web opposite to the margin marked by the web quality test and marking unit 106. The web then passes through a tension control and aligner unit 114, similar to the units 102 and 103. The web thereafter passes through a humidifier 115 which restores the paper web to its normal moist condition so that it will be suitable for printing. (Dehumidified paper tends to be brittle and to break up during printing.) If the material of the web is other than paper the humidifier 115 may not be necessary. The web 115 passes from the humidifier to a printer 116, which prints a value code in the margins as described in connection with FIG. 12. The web then passes to a trimmer and cutter 117, which removes excess margin material and cuts the web transversely into sheets. The sheets pass to a set of quality mark detectors 121. These detectors sense the marks applied to the web by the web quality tester 106 and by the coating quality tester 113. One of the detectors responds to marks applied to one margin by the web quality tester 106 and directs those rejected sheets to a first stacker 123. The other detector responds to marks applied by the unit 113 and directs those rejected sheets to a second stacker 123. Sheets which pass both the quality mark detectors are delivered to a stacker 124 where the correctly coded sheets are accumulated.

If desired, all sheets rejected, for whatever reason, might be discharged into the same stack. While a singly continuously receiving stacker 124 for the good sheets is indicated, a pair of alternately receiving stackers may be used in place of stacker 124.

The encoding coating preferably is applied to the substrate employing r.f. cathode sputtering techniques, including a cathode electrode formed of the material being sputtered. An anode or biased electrode is placed on the opposite side of the substrate. The two electrodes are supplied with electricity at radio frequency and at high voltage (6,000 volts or more). The coating chambers are filled with argon or other inert gas at a very low pressure, so that it is ionized by the high electric field. The ions are attracted toward and impinge on the cathode and sputter material particles therefrom. The particles are attracted toward the bias electrode during the half cycles when the electrodes are of the proper polarity. The particles sputtered from the electrode by the impinging ions travel in a straight line toward the bias electrode, and are intercepted by the substrate. The particles accumulate on that surface as a coating or in some cases penetrate the web for a substantial distance, so that the interface between the coating and the web forms a very strong bond.

The material particles which are driven by the applied high voltage may be energized with thousands of volts, and hence can be driven below the surface of the web. Typically, penetration depths range from 50 to 150 Angstrom units per thousand electron volts. Thus a graded interface is formed, even when the web and the coating material are mutually insoluble. The interface between the coating and the web can be so diffused that is is impossible to determine where the coating ends and the web begins. Such an interface provides an especially strong bond between the coating and the web.

It should be understood that the identity of the coatings applied to define the security document according to the invention herein is not limited. Almost any material, particularly an inorganic material, which can be deposited, can provide a band or bands meeting the structural definition of the invention so long as they have a machine only detectable physical characteristic which is visually minimally detectable, if at all. Variations may be made to the described structures without departing from the spirit and scope of the invention as defined in the appended claims.

What we claim is:

1. A security document of value having a mark detectable by apparatus responsive to electrical capacitance as a particular physical characteristic of the mark and thereby distinguishable from a counterfeit document lacking such a mark, comprising:
   a substrate of a first material free from said physical characteristic,
   a mark formed as a coating of a second material having said physical characteristic, said coating consisting of a particulate generally invisible very thin surface layer sputter-deposited on a portion only of one surface of said substrate and a sub-surface region below said very thin layer formed of discrete particles of said second material embedded within said first material arrayed in nonelectrically conductive relationship one relative to the others as a continuation of said thin surface layer, there being a greater number of particles of said second material in the sub-surface region than in the surface layer, the physical characteristic of said particulate material being electrical capacitance, said mark being nondetectable except by said apparatus and
   visually observable matter overprinted on said document.

2. The security document as claimed in claim 1 in which said overprinted matter extends at least in part over the coating.

3. The security document as claimed in claim 1 in which said document is an elongated sheet and said coating is a pattern of at least one band extending across the short dimension of the sheet.

4. The security document as claimed in claim 1 in which said coating having the physical characteristic is confined to a limited area of the substrate surface.

5. The security document as claimed in claim 1 in which said coating extends over at least one area of said document.

6. The security document as claimed in claim 1 in which said coating is less than 500 Angstrom units in thickness.

7. The security document as claimed in claim 1 in which said coating comprises at least a pair of spaced bands extending across the narrow dimension of said document.

8. The security document as claimed in claim 1 in which said coating is located in different limited areas of the document, the location depending upon the nature of said document and each location being different for different documents.

9. The security document as claimed in claim 1 in which said coating is sputtered onto said substrate.

10. The security document as claimed in claim 1 in which said overprinting is in registry with said coating.

11. The security document as claimed in claim 1 in which said visually observable matter overprinted on said document extends over said coating onto the substrate substantially surrounding said mark.

12. The security document as claimed in claim 1 in which there is a second coating over said substrate, said physical characteristic being absent from said second coating.

13. The security document as claimed in claim 12 in which there is a non-conductive coating over the substrate and the first coating.

14. The security document as claimed in claim 1 in which said coating covers completely one surface of the substrate so that all parts of the surface not covered by printed matter have a uniform finish.

15. The security document as claimed in claim 1 in which said coating is formed of indium tin oxide particles.

16. A security document of value having a mark detectable by apparatus responsive to a particular physical characteristic of the mark and thereby distinguishable from a counterfeit document lacking such a mark, comprising:
   a substrate of a first material free from said physical characteristic,
   a mark-defining coating of a second material having said physical characteristic, said coating consisting of a particulate generally invisible very thin layer sputter-deposited on a portion only of one surface of the substrate and a sub-surface region below said thin layer formed of discrete particles of said second material embedded within said first material under said coating as a continuation of said thin surface layer,
   the physical characteristic of said particulate material being electrical capacitance, visually nondetectable but its presence capable of being sensed only by said detecting apparatus and
   a layer of visually observable material on said document between said substrate and the coating of the second material.

17. A security document of value having a mark detectable by apparatus responsive to a particular physical characteristic of the mark and thereby distinguishable from a counterfeit document lacking such a mark, comprising:
   a substrate of a first material free from said physical characteristic,
   a mark-defining coating of a second material having said physical characteristic, said coating consisting of a particulate generally invisible very thin layer sputter-deposited on a portion only of one surface of the substrate and a sub-surface region below said thin layer formed of discrete particles of said second material embedded within said first material under said coating as a continuation of said thin surface layer, the physical characteristic of said particulate material being electrical capacitance, visually nondetectable but its presence capable of being sensed only by said detecting apparatus,
   visually observable matter printed on said document, and
   said coating is formed as a plurality of transparent thin layers each of different particulate materials other than said first material on one surface of the substrate and each layer of said particulate material having a substantial number of the particles embedded in a subsurface region of the substrate, one only of said layers comprising said coating and covering only a portion of said one surface and being detectable only by apparatus insensitive to the presence of the other of said layers.

18. The security document as claimed in claim 17 in which at least part of said visually observable matter is printed over at least one of said layers.

19. The security document as claimed in claim 17 in which at least one layer is applied over at least a part of the visually observable printed matter.

20. The security document as claimed in claim 17 and an outer layer formed of wear resistant material.

21. The security document as claimed in claim 17 in which all of said one surface is covered by the outer one of said layers.

22. The security document as claimed in claim 17 in which only the portion of said one surface not covered by said one layer is covered by a second of the layers.

23. The security document as claimed in claim 17 in which said coating is located on more than one portion of said one surface of the substrate, the characteristic of said coating at one portion being different than the characteristic of said coating at another portion of the said one surface.

24. A security document of value having a mark detectable by apparatus responsive to a particular physical characteristic of the mark and thereby distinguishable from a counterfeit document lacking such a mark, comprising:
   a substrate of a first material free from said physical characteristic,
   a mark defining coating of a second material having said physical characteristic,
   said coating consisting of a particulate generally invisible very thin layer sputter-deposited on a portion only of one surface of the substrate and a sub-surface region below said thin layer formed of discrete particles of said second material embedded within said first material under said coating as a continuation of said thin surface layer,
   the physical characteristic of said particulate material being electrical capacitance, visually nondetectable but is presence capable of being sensed only by said detecting apparatus,
   visually observable matter printed on said document and
   a transparent second coating of machine detectable material on a portion of the opposite surface of said substrate from said first mentioned coating and partially embedded in a subsurface region of said opposite surface.

25. The security document as claimed in claim 24 in which the machine detectable material of said transparent second coating is independently detectable relative to the machine detectable material of said first mentioned coating.

26. A sheet material suitable for printing a security document of a value and having a mark detectable by apparatus responsive to electrical capacitance as a particular physical characteristic of the mark, comprising:
   a substrate of a first material free from said physical characteristic,
   said mark being formed of a coating of a second material having said physical characteristic, said coating comprising particulate generally invisible thin surface layer deposited on a portion only of one surface of said substrate and a sub-surface region of particles of said second material embedded below said thin surface layer as a continuation of said thin surface layer, said subsurface region being substantially thicker than said thin surface layer,
   said coating being invisible and nondetectable physically except by said apparatus, the particles of at least the said subsurface layer consisting of particles arrayed in nonelectrically conductive relationship, one relative the other, and embedded therein.

27. A sheet material as claimed in claim 26 in which said first material is an elongated web and said coating is least one band extending lengthwise of the web.

28. A security document of value having a mark detectable by apparatus responsive to a particular physical characteristic of the mark and thereby distinguishable from a counterfeit document lacking such a mark, comprising:
   a substrate of a first material free from said physical characteristic, a mark-defining coating of a second material having said physical characteristic, said coating consisting of a particulate generally invisible very thin layer sputter-deposited on a portion only of one surface of the substrate and a sub-surface region below said thin layer formed of discrete particles of said second material embedded within said first material under said coating as a continuation of said thin surface layer, the depth of the sub-surface region being greater than the thickness of the thin layer, the physical characteristic of said particulate material being electrical capacitance, visually nondetectable but its presence capable of being sensed only by said detecting apparatus and visually observable matter printed on said document.

29. The security document as claimed in claim 28 in which said coating is applied over at least part of the visually observable matter and over a part of the substrate not covered by the observable matter.

* * * * *